(12) United States Patent
Rao

(10) Patent No.: US 12,361,667 B2
(45) Date of Patent: Jul. 15, 2025

(54) TEXT PROCESSING METHOD AND APPARATUS, AND ELECTRONIC DEVICE AND STORAGE MEDIUM

(71) Applicant: BOE Technology Group Co., Ltd., Beijing (CN)

(72) Inventor: Tianmin Rao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 484 days.

(21) Appl. No.: 17/921,191

(22) PCT Filed: May 15, 2020

(86) PCT No.: PCT/CN2020/090646
§ 371 (c)(1),
(2) Date: Oct. 25, 2022

(87) PCT Pub. No.: WO2021/227058
PCT Pub. Date: Nov. 18, 2021

(65) Prior Publication Data
US 2023/0169784 A1    Jun. 1, 2023

(51) Int. Cl.
*G06V 10/24*     (2022.01)
*G06V 30/18*     (2022.01)

(52) U.S. Cl.
CPC ............ *G06V 10/24* (2022.01); *G06V 30/18* (2022.01)

(58) Field of Classification Search
CPC ........ G06V 10/24; G06V 30/18; G06V 20/63; G06V 20/00; G06V 30/10
See application file for complete search history.

(56) References Cited

U.S. PATENT DOCUMENTS

| | | | | |
|---|---|---|---|---|
| 8,086,040 B2* | 12/2011 | Fan | .......................... | H04N 1/41 382/190 |
| 9,569,679 B1* | 2/2017 | Gray | ................... | H04N 1/40062 |
| 11,830,264 B2* | 11/2023 | Rossi | ....................... | G06T 7/194 |
| 2002/0085758 A1* | 7/2002 | Ayshi | .................... | G06V 30/184 382/199 |
| 2006/0174199 A1* | 8/2006 | Soltis | .................... | G06F 40/103 715/700 |
| 2011/0200257 A1* | 8/2011 | Oh | .......................... | G06V 20/62 382/195 |
| 2016/0210523 A1* | 7/2016 | Abdollahian | ........... | G06V 30/40 |
| 2019/0095743 A1* | 3/2019 | Li | ......................... | G06V 30/412 |
| 2021/0073323 A1* | 3/2021 | Fisher | ....................... | G06T 3/02 |

* cited by examiner

*Primary Examiner* — Wesley J Tucker
(74) *Attorney, Agent, or Firm* — WHDA, LLP

(57) ABSTRACT

A text processing method and apparatus, an electronic device, and a storage medium. The method includes: according to a coordinate value of each pixel in a text image, determining a plurality of center pixels of the text image and an adjacent pixel of each center pixel (S1); acquiring a coordinate value of each center pixel, a spatial offset of the adjacent pixel of each center pixel, and the width of a pixel processing area (S2); acquiring position information of each adjacent pixel according to the coordinate value of each center pixel, the spatial offset of the adjacent pixel of each center pixel, the width of the pixel processing area, and a preset vector calculation formula (S3); and acquiring a text of the text image according to the position information and a preset mask mapping relationship (S4).

15 Claims, 3 Drawing Sheets

Center pixel and spaces of eight neighbours

Positive pixel link for adjacent pixels

Center pixel and spaces of eight neighbours

Positive pixel link for adjacent pixels

TEXT PROCESSING METHOD AND APPARATUS, AND ELECTRONIC DEVICE AND STORAGE MEDIUM

TECHNICAL FIELD

The present disclosure relates to the technical field of data processing, in particular to a text processing method and apparatus, an electronic device, and a storage medium.

BACKGROUND

Text translation is divided into two steps: text detection and text recognition. The text detection is mainly to classify pixels in an image to distinguish a text portion and a background portion and circle a selected difference to determine a divisional boundary; and the text recognition is mainly to recognize a circled text image and perform translation according to trained Chinese and English contents.

SUMMARY

The content portion of the present disclosure provides a text recognition method and apparatus, an electronic device, and a storage medium to solve the problem in the related art of when text detection processing is performed, the calculation efficiency being significantly reduced due to a reduction in the processing speed of the entire algorithm as a result of an increase in the number of access times of a register caused by using the logic of sequential determination for pixel edge determination.

An embodiment in a first aspect of the present disclosure provides a text processing method, including the following steps: according to a coordinate value of each pixel in a text image, determining a plurality of center pixels of the text image and adjacent pixels of each of the center pixels; acquiring a coordinate value of each of the center pixels, spatial offsets of the adjacent pixels of each of the center pixels, and a width of a pixel processing area; acquiring position information of each of the adjacent pixels according to the coordinate value of each of the center pixels, the spatial offsets of the adjacent pixels of each of the center pixels, the width of the pixel processing area, and a preset vector calculation formula; and acquiring a text of the text image according to the position information and a preset mask mapping relationship.

An embodiment in a second aspect of the present disclosure provides a text processing apparatus, including: a determination module configured to, according to a coordinate value of each pixel in a text image, determine a plurality of center pixels of the text image and adjacent pixels of each of the center pixels; a first acquisition module configured to acquire a coordinate value of each of the center pixels, spatial offsets of the adjacent pixels of each of the center pixels, and a width of a pixel processing area; a calculation module configured to acquire position information of each of the adjacent pixels according to the coordinate value of each of the center pixels, the spatial offsets of the adjacent pixels of each of the center pixels, the width of the pixel processing area, and a preset vector calculation formula; and a second acquisition module configured to acquire a text of the text image according to the position information and a preset mask mapping relationship.

An embodiment in a third aspect of the present disclosure provides an electronic device, including: at least one processor, and a memory in communication connection with the at least one processor; wherein the memory stores an instruction which is capable of being executed by the at least one processor, and the instruction is configured to perform the text processing method in the above-mentioned embodiment.

An embodiment in a fourth aspect of the present disclosure provides a computer-readable storage medium storing a computer program, wherein the program is executed by a processor to implement the above-mentioned text processing method.

In the method, the position information of each of the adjacent pixels may be determined in a way of concurrent calculation after the coordinate value of each center pixel, the spatial offsets of the adjacent pixels of each center pixel, and the width of the pixel processing area are acquired, and thus, the text of the text image is acquired according to the position information and the preset mask mapping relationship. Therefore, by adopting the way that data acquired during text detection processing is rearranged, a data determination condition is optimized for calculation, and basic operation is combined with concurrent processing, the processing speed of a text detection post-processing algorithm is effectively increased, and the problem in the related art of when text detection processing is performed, the calculation efficiency being significantly reduced due to a reduction in the processing speed of the entire algorithm as a result of an increase in the number of access times of a register caused by using the logic of sequential determination for pixel edge determination is solved.

Parts of additional aspects and advantages of the present disclosure will be given in the following descriptions, and parts thereof become apparent in the following descriptions or known by practice from the present disclosure.

BRIEF DESCRIPTION OF THE DRAWINGS

The above-mentioned and % or additional aspects and advantages of the present disclosure will become apparent and understandable from the following descriptions for embodiments with reference to the accompanying drawings, in which.

DETAILED DESCRIPTION OF THE EMBODIMENTS

Below, the embodiments of the present disclosure are described in detail, and examples of the embodiments are shown in the accompanying drawings, wherein the same or similar numerals throughout indicate same or similar elements or elements with same or similar functions. The following embodiments described with reference to the accompanying drawings are exemplary, are intended to explain the present disclosure, but cannot be understood as limitations on the present disclosure.

A text processing method and apparatus, an electronic device and a storage medium in embodiments of the present disclosures will be described below with reference to the accompanying drawings.

Before the text processing method in an embodiment of the present disclosure is introduced, a text processing method in the related art is briefly introduced.

A translation pen is a text learning auxiliary equipment, and a user inputs a corresponding image of a text to perform offline OCR processing by means of a processor loaded on the pen. In this process, a deep learning model is mainly utilized to perform network calculation on a terminal. For the deep learning model, for pixels of the input image, there may be two kinds of classification prediction: text and non-text prediction. For the text and non-text prediction, the pixels in the image are divided into "positive pixels" (representing texts) and "negative pixels" (representing non-texts). Then, the texts belonging to the positive pixels are linked together by a positive link to achieve example segmentation of the texts and the non-texts, and next, bounding boxes of the texts are extracted from segmented text results.

Figure 1:
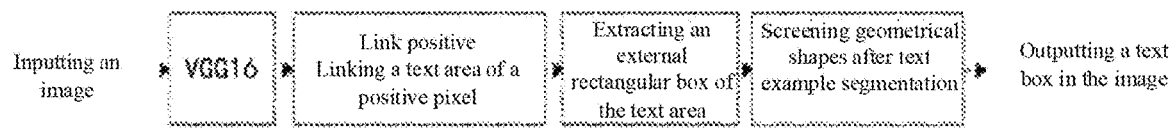
FIG. 1 is a schematic diagram showing a working process of text detection based on Pixelink.

Specifically, as shown in FIG. 1, FIG. 1 is a schematic diagram showing a working process of text detection based on Pixelink in related art. The work of the text and non-text prediction is completed by Convolutional Neural Networks (CNNs), a backbone network may select an Oxford Visual Geometry Group (VGG16, VGG network), after a predicted result is detected, the classification of a full image is obtained by thresholding, each pixel is divided into a "text-positive pixel" and a "non-text-negative pixel" which are respectively marked as 1 and 0 and are processed to obtain masks 0 and 1 of the full image, and thus, text and non-text portions are distinguished.

Figure 2:
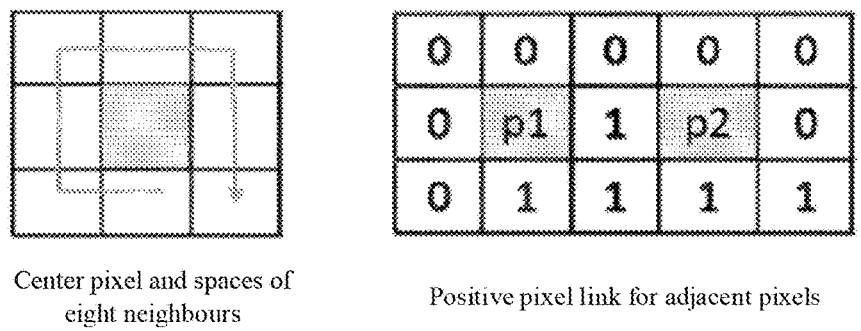
FIG. 2 is a schematic diagram showing a positive pixel text link based on 8 neighbours.

As shown in FIG. 2, in a link positive process, the eight adjacent pixels of each of center pixels may be searched through the CNN, and it is determined whether there are positive pixels; and link situations of eight directions may be detected in each link work, so that the text and non-text portions in the image are sequentially separated, and an external rectangular box of a result text area is extracted. It needs to be noted that the pixels after neural network calculation is completed may be divided into a "text" or "background", wherein the "text" is marked as positive, and the "background" is marked as negative; and link positive means that the pixels belonging to the "text" are stored into a fixed data structure according to a certain precedence relationship and are used for subsequent processing and calculation. In addition, there will be certain noise during processing, and therefore, further filtration is needed. In the solution, screening for geometrical shapes has been used, and a text box area in the image is acquired by once filtration.

Figure 3:
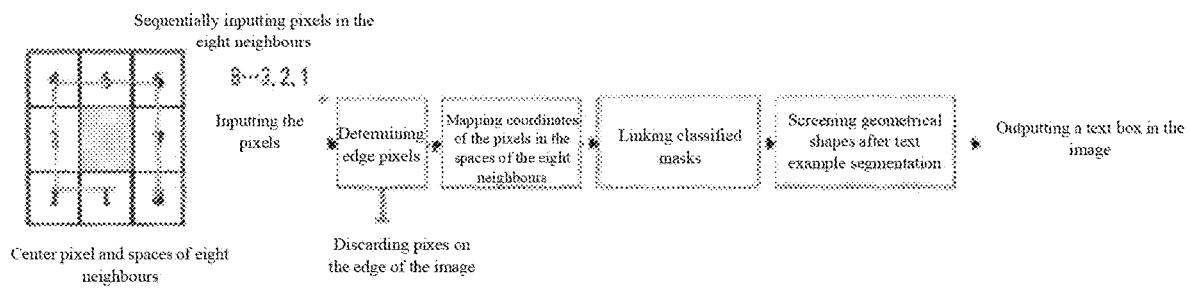
FIG. 3 is a schematic diagram showing a link positive process for text detection post-processing.

In the above-mentioned calculation, the work of text box extraction other than neural network calculation of the VGG16 needs to be sequentially executed pixel by pixel. Specifically, as shown in FIG. 3, during post-processing of text detection, i.e. the entire detection process begins from image input, a classification result is acquired by neural network calculation, and it is determined whether the pixels belong to the "text" or the "background"; after the information is acquired, the "text" pixels are further classified, the "text" belonging to a certain word is stored in the same storage space, and such processing is referred to as the post-processing of the entire process. Firstly, edge determination is performed, a processed image window is an 81×81 area, and in such a space, each processed pixel has to have the complete eight neighbors. Therefore, when a pixel is processed, firstly, it is determined whether coordinates of the pixel are within the range from (1, 1) to (80, 80); and meanwhile, it also needs to be determined that the processed pixel does not belong to an edge portion of the entire image. If the pixel satisfies a demand, the spaces of the eight neighbours near the center pixel are sequentially determined, and every time when the coordinates are moved, a multiplication and an addition are performed to determine a target which should be processed. After the processing is ended, the coordinates are put into a lookup table; and since each point in an image analyzed by a neural network has been marked as the "positive pixel": 1 or the "negative pixel": 0, in the lookup work, it will be determined whether the detected pixels belong to the "text" or the "non-text", and they will be updated to a connectivity list. The entire process is to decode, which is equivalent to that an image 0/1 encoded by the neural network is subjected to text box segmentation by means of a connection relationship.

However, in this process, the pixels in the spaces of the eight neighbours are determined sequentially, that is, calculation begins from a first pixel on the top-left corner to the last pixel on the lower-right corner row column, such a sequential execution way is lower in efficiency. Firstly, for single pixel, it is necessary to search the pixels in the eight neighbours surrounding the pixel one by one; and secondly, for each pixel, the above-mentioned operation will be performed one by one. The determination for the entire sequential execution reduces the processing speed of the entire algorithm. During actual operation, if operation is performed on a relatively weak CPU (about 900 Mhz), the part of work will take about 50% of operation time.

The present disclosure provides a text recognition method. In this method, the position information of each adjacent pixel can be determined in a way of concurrent calculation after the coordinate value of each center pixel, the spatial offsets of the adjacent pixels of each center pixel, and the width of the pixel processing area are acquired, and thus, the text of the text image is obtained according to the position information and the preset mask mapping relationship. Therefore, by adopting the way that data acquired during text detection processing is rearranged, a data determination condition is optimized for calculation, and basic operation is combined with concurrent processing, the processing speed of a text detection post-processing algorithm is effectively increased, and the problem in the related art of when text detection processing is performed, the calculation efficiency being significantly reduced due to a reduction in the processing speed of the entire algorithm as a result of an increase in the number of access times of a register caused by using the logic of sequential determination for pixel edge determination is solved.

Figure 4:
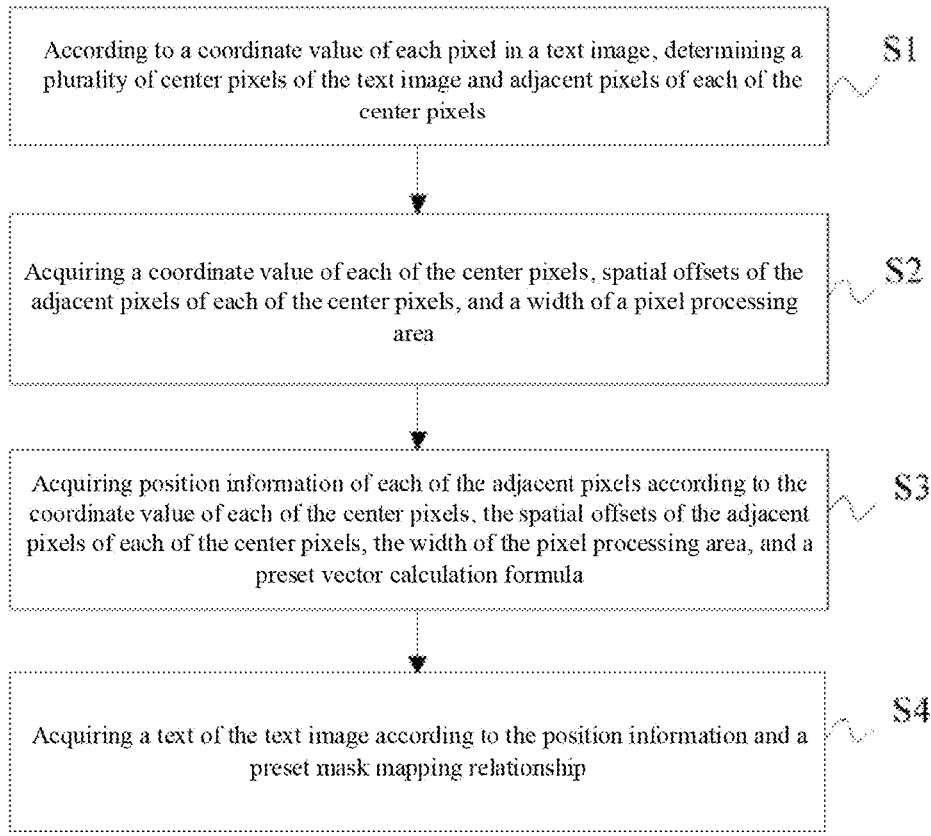
FIG. 4 is a flow chart showing a text processing method according to an embodiment of the present disclosure.

FIG. 4 is a schematic process diagram showing a text processing method according to an embodiment of the present disclosure.

As shown in FIG. 4, the text processing method includes the following steps:

S1, according to a coordinate value of each pixel in a text image, a plurality of center pixels of the text image and adjacent pixels of each of the center pixels are determined.

In an embodiment of the present disclosure, the step that according to a coordinate value of each pixel in a text image, a plurality of center pixels of the text image and adjacent pixels of each of the center pixels are determined includes:

a coordinate value of each pixel in the text image and the width and height of the pixel processing area are acquired; it is determined whether the coordinate value of each pixel in the text image satisfies preset conditions; and pixels satisfying the preset conditions are used as the center pixels.

It can be understood that, if the pixel processing area is the 81×81 area in which the processed pixel has to have the complete eight neighbours, that is, the pixel is used as a center pixel. Therefore, when a pixel is processed, firstly, it needs to determine whether coordinates of the pixel are within the range from (1, 1) to (80, 80); and meanwhile, it also needs to be determined that the processed pixel does not belong to the edge portion of the entire image.

Therefore, in the embodiment of the present disclosure, determination may be performed according to the coordinate value of each pixel in the text image as well as the width and height of the pixel processing area. In an embodiment of the present disclosure, the preset conditions may be that the horizontal coordinate of the pixel is greater than or equal to 0; the vertical coordinate of the pixel is greater than or equal to 0; and the horizontal coordinate and the vertical coordinate of the pixel are respectively less than the width and height of the pixel processing area. It may be determined, by a neon register, whether the preset conditions are satisfied.

Optionally, in an embodiment of the present disclosure, the neon register is any one of a 128 bit register and a 64 bit register.

Figure 5:
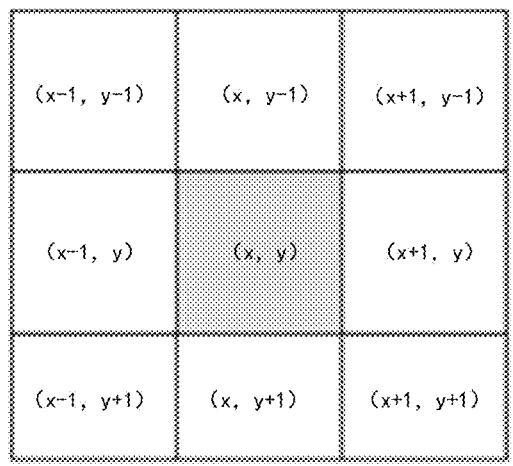
FIG. 5 is an expansion schematic diagram showing edge determination based on a plurality of data streams according to an embodiment of the present disclosure.

For example, as shown in FIG. 5, FIG. 5 is an expansion schematic diagram showing edge determination based on a plurality of data streams. It is assumed that the coordinate of each of the center pixels is (x, y), coordinate of neighborhood pixel 1 is (x−1, y−4), coordinate of neighborhood pixel 2 is (x, y−1), coordinate of neighborhood pixel 3 is (x+1, y−1), coordinate of neighborhood pixel 4 is (x−1, y), coordinate of neighborhood pixel 5 is (x+1, y), coordinate of neighborhood pixel 6 is (x−1, y+1), coordinate of neighborhood pixel 7 is (x, y+1) and coordinate of neighborhood pixel 8 is (x+1, y+1).

Therefore, during edge determination, neighborhood pixel 1 needs to meet the conditions: x−1>=0, x−1<=w, y−1<=0, and y−1<h; neighborhood pixel 2 needs to meet the conditions: x>=0, x<=w, y−1<=0, and y−1<h; neighborhood pixel 3 needs to meet the conditions: x+1>=0, x+1<=w, y−1<=0, and y−1<=h; neighborhood pixel 4 needs to meet the conditions: x−1>=0, x−1<=w, y<=0, and y<h; neighborhood pixel 5 needs to meet the conditions: x+1>=0, x+1<=w, y<=0, and y<h; neighborhood pixel 6 needs to meet the conditions: x−1>=0, x−1<=w, y+1<=0, and y+1<h; neighborhood pixel 7 needs to meet the conditions: x>=0, x<=w, y+1<=0, and y+1<h; and neighborhood pixel 8 needs to meet the conditions: x+1>=0, x+1<w, y+1<=0, and y+1<h.

It needs to be noted that a register adopted in related art is generally a 32 bit arm processor at most storing 32 bit data once; moreover, the arm processor adopts a von Neumann architecture, is capable of reading and processing each instruction once, and is incapable of concurrently processing a plurality of data, a CPU can only calculate one piece of data and return one calculation result every time, and therefore, during the above-mentioned calculation in related art, calculation needs to be performed for eight times in total, the total time consumption is longer, and the processing speed is greatly reduced.

Therefore, in the embodiment of the present disclosure, in views of the characteristics of the neon register, the hardware is implemented by armv7 and armv8, 64 bit data and 128 bit data may be segmented for 4-segmentation and 8-segmentation calculation respectively. For example, during program design, the 64 bit data may be divided into four pieces of 16 bit data or the 128 bit data may be divided into four pieces of 32 bit data or sixteen pieces of 8 bit data in an artificial way. In the embodiment of the present disclosure, when the neon register is adopted, a plurality of data may be acquired at the same time, meanwhile, a response to a processing unit is made, and the taken data may be processed at the same time and written back. In the above-mentioned example, the edge determination for the eight neighbours is directly stored by a 8 bit array; according to a vector calculation characteristic of the neon register, determination results of columns are concurrently calculated, and then, determination results of rows are concurrently calculated, that is, in the embodiment of the present disclosure, four conditions of eight adjacent pixels may be calculated at the same time, and determination may also be calculated at the same time by grouping, so that the calculation time can be greatly shortened. Compared with one-by-one calculation in related art, the determination reduces the number of access times of the register and increases the operation speed of a module.

S2, a coordinate value of each of the center pixels, spatial offsets of the adjacent pixels of each of the center pixels, and the width of a pixel processing area are acquired.

S3, position information of each adjacent pixel is acquired according to the coordinate value of each of the center pixels, the spatial offsets of the adjacent pixels of each of the center pixels, the width of the pixel processing area, and a preset vector calculation formula.

In an embodiment of the present disclosure, the step that position information of each adjacent pixel is acquired according to the coordinate value of each of the center pixels, the spatial offsets of the adjacent pixels of each of the center pixels, the width of the pixel processing area, and a preset vector calculation formula includes: horizontal coordinate and vertical coordinate of each of the center pixels are acquired; a first vector product is acquired according to the width of the pixel processing area and the spatial offsets of the adjacent pixels; a second vector product is acquired according to the horizontal coordinate of each of the center pixels and the spatial offsets of the adjacent pixels; a third vector product is acquired according to the first vector product and the vertical coordinates of each of the center pixels; and the position information of each adjacent pixel is acquired according to the second vector product and the third vector product.

It can be understood that, although the concurrent calculation way adopted in the embodiment of the present disclosure is more complex than a single calculation way adopted in related art, vector calculation of rows and columns may be completed at the same time in a single register, and the neon register is adopted in the embodiment of the present disclosure, so that multi-vector calculation may be operated by the algorithm.

Specifically, in the embodiment of the present disclosure, when multi-vector calculation is operated, the calculation may be performed as a multiplication vector and an addition vector, wherein a calculation formula may be expressed as:

$$position = y*w*neighbours + x*neighbours;$$

wherein x is the horizontal coordinate of each of the center pixels, y is the vertical coordinate of each of the center pixels, w is the width of the pixel processing area, and neighbours are the offsets of the spaces of the eight neighbours and are respectively 1 to 8; and after calculation performed according to the above-mentioned formula, the corresponding coordinate values of all the pixels may be acquired, that is, the position information of each of the adjacent pixels may be acquired.

In an embodiment of the present disclosure, each of the center pixels includes eight adjacent pixels adjacent to the center pixel, wherein, two pixels are located in a row where the center pixel is located, three pixels are located in a row previous to the row where the center pixel is located, and three pixels are located in a row next to the row where the center pixel is located; and the spatial offsets of the eight pixels are respectively 1, 2, 3, 4, 5, 6, 7, and 8 according to an order from left to right in each row and an order from top to bottom in adjacent rows of pixels.

That is, as shown in FIG. 5, the center pixel is located on the coordinate (x, y), and eight adjacent pixels adjacent to the center pixel are respectively: two pixels located in a row where the center pixel is located, e.g. (x, y−1) and (x, y+1) of which the corresponding spatial offsets may be 4 and 5; three pixels located in a row previous to the row where the center pixel is located, e.g. (x−1, y−1), (x, y−1) and (x+1, y−1) of which the corresponding spatial offsets may be 1, 2 and 3; and three pixels located in a row next to the row where the center pixel is located, e.g. (x−1, y+1). (x, y+1) and (x+1, y+1) of which the corresponding spatial offsets may be 6, 7 and 8.

Figure 6:
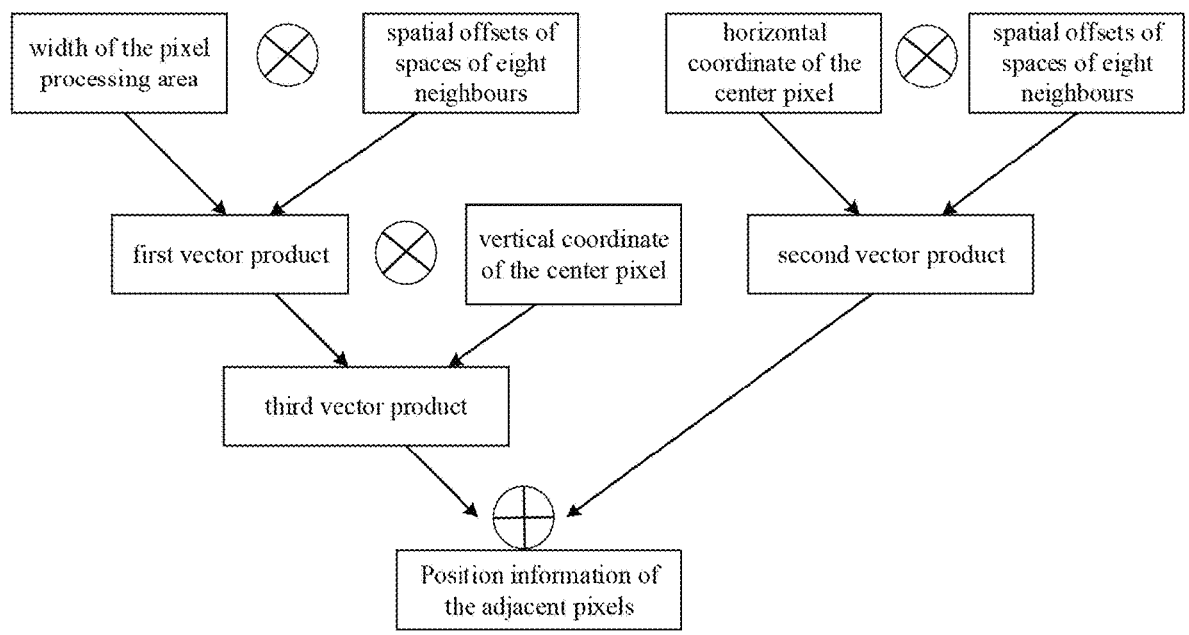
FIG. 6 is an expansion schematic diagram showing coordinate mapping according to an embodiment of the present disclosure.

Further, with reference to FIG. 5 and FIG. 6, vector representation is shown in all boxes in FIG. 6. It is assumed that the width of the pixel processing area is 80, concurrent operation results may be shown as follows:

$$\text{Position}(x-1, y-1) = y*80*1 + x*1;$$

$$\text{Position}(x, y-1) = y*80*2 + x*2;$$

$$\text{Position}(x+1, y-1) = y*80*3 + x*3;$$

$$\text{Position}(x-1, y) = y*80*4 + x*4;$$

$$\text{Position}(x+1, y) = y*80*5 + x*5;$$

$$\text{Position}(x-1, y+1) = y*80*6 + x*6;$$

$$\text{Position}(x, y+1) = y*80*7 + x*7;$$

$$\text{Position}(x+1, y+1) = y*80*8 + x*8.$$

It should be noted that the above-mentioned calculation includes multiplication vector calculation and addition vector calculation. Therefore, it is observed that, during 8-neighbour calculation in related art, cyclic operation needs to be performed for eight times, that is, multiplication needs to be performed for 8*3 times, and addition needs to be performed for 8*1 times. However, in the present disclosure, after the current data is rearranged and vectorized, the position information of each adjacent pixel may be acquired by performing multiplication for three times and addition once in total. Compared with calculation in related art, the method in the embodiment of the present disclosure greatly reduces the number of times of the multiplication and also reduces the number of times that an internal memory accesses results. For example, by post-processing a 640*480 image on an arm CPU which is 900 Mhz, the processing time may be shortened by about 30%, and the text detection is effectively accelerated.

S4, a text of the text image is acquired according to the position information and a preset mask mapping relationship.

It can be understood that pixel data is two-dimensional data and is generally stored in a continuous address one-dimensionally when being stored in a storage space, and therefore, an accurate pixel value may be acquired by acquiring the address of each pixel. In the embodiment of the present disclosure, a mask mapping relationship between the position information and the coordinates of each directional point of the adjacent pixel in a matrix may be preset. As shown in table 1 which is a coordinate value of each directional point of the adjacent pixel in the matrix in the embodiment of the present disclosure, wherein the coordinate value may be a fixed value, and the mask mapping relationship between the position information and the coordinates of each directional point of the adjacent pixel in the matrix may be expressed as follows:

for example, coordinate (1, 1) correspond to the position information, i.e. position (x−1, y−1); coordinate (1, 2) correspond to the position information, i.e. position (x, y−1); coordinate (1, 3) correspond to the position information, i.e. position (x+1, y−1); coordinate (2, 1) correspond to the position information. i.e. position (x−1, y); coordinate (2, 3) correspond to the position information, i.e. position (x+1, y); coordinate (3, 1) correspond to the position information, i.e. position (x−1, y+1); coordinate (3, 2) correspond to the position information, i.e. position (x, y+1); and coordinate (3, 3) correspond to the position information, i.e. position (x+1, y+1).

TABLE 1

| (1, 1) | (1, 2) | (1, 3) |
|--------|--------|--------|
| (2, 1) | (2, 2) | (2, 3) |
| (3, 1) | (3, 2) | (3, 3) |

Therefore, after the position information of each of the adjacent pixels is acquired, the text of the text image may be acquired according to the position information and the preset mask mapping relationship.

According to the text processing method provided in the embodiment of the present disclosure, the position information of each adjacent pixel may be determined in a way of concurrent calculation after the coordinate value of each center pixel, the spatial offsets of the adjacent pixels of each center pixel, and the width of the pixel processing area are acquired, and thus, the text of the text image is acquired according to the position information and the preset mask mapping relationship. Therefore, by adopting the way that data acquired during text detection processing is rearranged, a data determination condition is optimized for calculation, and basic operation is combined with concurrent processing, the processing speed of a text detection post-processing algorithm is effectively increased, and the problem in the related art of when text detection processing is performed, the calculation efficiency being significantly reduced due to a reduction in the processing speed of the entire algorithm as a result of an increase in the number of access times of a register caused by using the logic of sequential determination for pixel edge determination is solved.

Secondly, the text processing apparatus provided according to the embodiment of the present disclosure is described with reference to the accompanying drawings.

Figure 7:
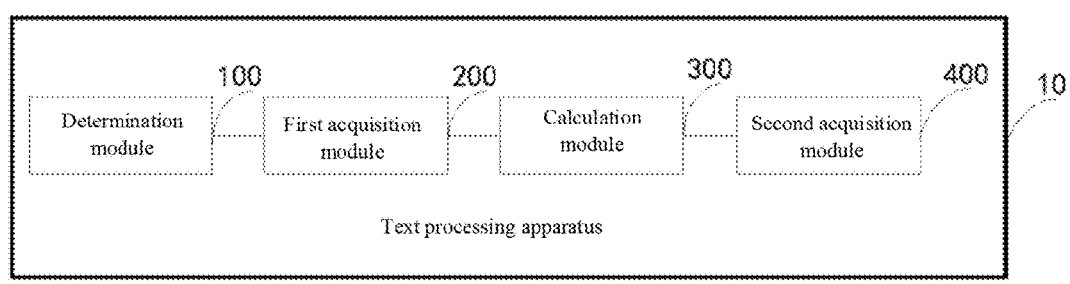
FIG. 7 is a schematic block diagram showing a text processing apparatus according to an embodiment of the present disclosure.

FIG. 7 is a schematic block diagram showing a text processing apparatus according to an embodiment of the present disclosure.

As shown in FIG. 7, the text processing apparatus 10 includes a determination module 100, a first acquisition module 200, a calculation module 300, and a second acquisition module 400.

The determination module 100 is configured to, according to a coordinate value of each pixel in a text image, determine a plurality of center pixels of the text image and adjacent pixels of each of the center pixels. The first acquisition module 200 is configured to acquire a coordinate value of each of the center pixels, spatial offsets of the adjacent pixels of each of the center pixels, and a width of a pixel processing area. The calculation module 300 is configured to acquire position information of each adjacent pixel according to the coordinate value of each of the center pixels, the spatial offsets of the adjacent pixels of each of the center pixels, the width of the pixel processing area, and a preset vector calculation formula. The second acquisition module 400 is configured to acquire a text of the text image according to the position information and a preset mask mapping relationship.

It needs to be noted that the foregoing explanation and description for the embodiment of the text processing method are also applicable to the text processing apparatus in the embodiment, the descriptions thereof are omitted herein.

According to the text processing apparatus provided in the embodiment of the present disclosure, the position information of each adjacent pixel may be determined in a way of concurrent calculation after the coordinate value of each center pixel, the spatial offsets of the adjacent pixels of each center pixel, and the width of the pixel processing area are acquired, and thus, the text of the text image is acquired according to the position information and the preset mask mapping relationship. Therefore, by adopting the way that data acquired during text detection processing is rearranged, a data determination condition is optimized for calculation, and basic operation is combined with concurrent processing, the processing speed of a text detection post-processing algorithm is effectively increased, and the problem in the related art of when text detection processing is performed, the calculation efficiency being significantly reduced due to a reduction in the processing speed of the entire algorithm as a result of an increase in the number of access times of a register caused by using the logic of sequential determination for pixel edge determination is solved.

In order to implement the above-mentioned embodiment, the present disclosure further provides an electronic device, including at least one processor and a memory. The memory is in communication connection with the at least one processor, wherein the memory stores an instruction which can be executed by the at least one processor, and the instruction is configured to perform the text processing method in the above-mentioned embodiment, for example, the instruction is configured to:

according to a coordinate value of each pixel in a text image, determine a plurality of center pixels of the text image and adjacent pixels of each of the center pixels;

acquire a coordinate value of each of the center pixels, spatial offsets of the adjacent pixels of each of the center pixels, and the width of a pixel processing area;

acquire position information of each adjacent pixel according to the coordinate value of each of the center pixels, the spatial offsets of the adjacent pixels of each of the center pixels, the width of the pixel processing area, and a preset vector calculation formula; and acquire a text of the text image according to the position information and a preset mask mapping relationship.

In order to achieve the above-mentioned embodiments, the present disclosure further provides a computer-readable storage medium storing a computer program, wherein the program is executed by a processor to implement the above-mentioned text processing method.

In the descriptions of the present description, descriptions with reference to terms "an embodiment", "some embodiments", "examples", "specific examples", or "some examples", etc. are intended to be included in at least one embodiment or example of the present disclosure in combination with specific features, structures, materials or characteristics described in the embodiment or example. In the present description, the schematic statement for the above-mentioned terms is not necessarily directed to the same embodiment or example. Moreover, the described specific features, structures, materials or characteristics may be combined in any one or N embodiments or examples in an appropriate way. In addition, different embodiments or examples described in the present description and features in the different embodiments or examples may be integrated or combined by the skill in the art without mutual conflicts.

In addition, terms "first" and "second" are be for descriptive purposes only, and cannot be understood as indicating or implying the relative importance or implicitly indicating the number of indicated technical features. Therefore, the features defined as "first" and "second" may explicitly or implicitly include at least one of the features. In the descriptions of the present disclosure, the meaning of "N" may be at least two, for example, two and three, unless it may be specifically defined otherwise.

Any description for a process or method described in the process diagram or described herein in other ways may be understood as indicating a module, segment or part including one or N codes of executable instructions used for achieving customized logic functions or steps of the process, and the scope of preferred implementations of the present disclosure includes other implementations, wherein the functions may be implemented out of a shown or discussed order including a basically simultaneous way based on the involved functions or an opposite order, which should be understood by the skill in the art to which the embodiments of the present disclosure belong.

Logics and/or steps shown in the process diagrams or described herein in other ways may be regarded as, for example, a fixed sequence table of the executable instructions for implementing logic functions and may be specifically implemented in any computer-readable medium so as to be used by an instruction execution system, apparatus or device (e.g. a system based on a computer, a system including a processor, or other systems capable of acquiring instructions from the instruction execution system, apparatus or device and executing the instructions) or to be used in combination with these instruction execution system, apparatus or device. For the description, the "computer-readable medium" may be any apparatus which may include, store, communicate, propagate or transmit a program so as to be used by the instruction execution system, apparatus or device or to be used in combination with the instruction execution system, apparatus or device. More specific examples (non-exhaustive lists) of the computer-readable medium include the following: an electric connection part (electronic apparatus) provided with one or N wrings, a portable computer disc case (magnetic apparatus), a random access memory (RAM), a read-only memory (ROM), an erasable programmable logic read-only memory (EPROM or flash memory), an optical fiber apparatus, and a portable CD read-only memory (CDROM). In addition, the computer-readable medium may even be paper or other appropriate media on which the program may be printed, which is due to the fact that the program may be acquired in an electronic way, for example, the paper or other media are optically scanned and then compiled and explained or processed in other appropriate ways when it is necessary; and then, the program is stored in a computer memory.

It should be understood that all parts of the present disclosure may be implemented by means of hardware, software, firmware or their combinations. In the above-mentioned implementations, N steps or methods may be implemented by means of software or firmware stored in the memory and executed by an appropriate instruction execution system. For example, if it is implemented by means of hardware, similar to that in another implementation way, it may be implemented by any one of the following technologies known in the art and their combinations: a discrete logic circuit provided with a logic gate circuit used for implementing a logic function for a data signal, an application-specific integrated circuit provided with an appropriate combined logic gate circuit, a programmable gate array (PGA), a field-programmable gate array (FPGA), etc.

It can be understood by the ordinary skill in the art that all or parts of the steps of the methods in the above-mentioned embodiments can be completed by a program instructing relevant hardware, the program can be stored in a computer-readable storage medium, and the program, when being executed, includes one of the steps in the embodiments of the method or a combination thereof.

In addition, all the functional units in each embodiment of the present disclosure may be integrated in one processing module, or all the units physically exists alone, or two or more units are integrated in one module. The above-mentioned integrated module may be implemented in a form of hardware or in a form of a software functional module. When being implemented in the form of the software functional module and is used as an independent product to be sold or used, the integrated module may also be stored in a computer-readable storage medium.

The storage medium mentioned as above may be a read-only memory, a hard disk or an optical disk, etc. Although the embodiments of the present disclosure have been shown and described as above, it can be understood that the above-mentioned embodiments are exemplary, but cannot be understood as limitations on the present disclosure. The ordinary skill in the art can make changes, modifications, substitutions and variations on the above-mentioned embodiments within the scope of the present disclosure.

The invention claimed is:

1. A text processing method, comprising:
    according to a coordinate value of each pixel in a text image, determining a plurality of center pixels of the text image and adjacent pixels of each of the center pixels;
    acquiring a coordinate value of each of the center pixels, spatial offsets of the adjacent pixels of each of the center pixels, and a width of a pixel processing area;
    acquiring position information of each of the adjacent pixels according to the coordinate value of each of the center pixels, the spatial offsets of the adjacent pixels of each of the center pixels, the width of the pixel processing area, and a preset vector calculation formula; and
    acquiring a text of the text image according to the position information and a preset mask mapping relationship.

2. The text processing method according to claim 1, wherein the step of acquiring position information of each of the adjacent pixels according to the coordinate value of each of the center pixels, the spatial offsets of the adjacent pixels of each of the center pixels, the width of the pixel processing area, and a preset vector calculation formula comprises:
    acquiring a horizontal coordinate and a vertical coordinate of each of the center pixels;
    acquiring a first vector product according to the width of the pixel processing area and the spatial offsets of the adjacent pixels;
    acquiring a second vector product according to the horizontal coordinate of each of the center pixels and the spatial offsets of the adjacent pixels;
    acquiring a third vector product according to the first vector product and the vertical coordinate of each of the center pixels; and
    acquiring the position information of each of the adjacent pixels according to the second vector product and the third vector product.

3. The text processing method according to claim 1, wherein the adjacent pixels of each of the center pixels comprises eight pixels adjacent to the center pixel, the eight pixels comprises two pixels located in a row where the center pixel is located, three pixels located in a row previous to the row where the center pixel is located, and three pixels located in a row next to the row where the center pixel is located; and the spatial offsets of the eight pixels are respectively 1, 2, 3, 4, 5, 6, 7, and 8 according to an order from left to right in each row and an order from top to bottom in adjacent rows of pixels.

4. The text processing method according to claim 1, wherein the step of according to a coordinate value of each pixel in a text image, determining a plurality of center pixels of the text image and adjacent pixels of each of the center pixels comprises:
    acquiring a coordinate value of each pixel in the text image and the width and height of the pixel processing area;
    determining whether the coordinate value of each pixel in the text image satisfies preset conditions; and
    taking pixels satisfying the preset conditions as the center pixels.

5. The text processing method according to claim 4, wherein the preset conditions are that:
    the horizontal coordinates of the pixels are greater than or equal to 0;
    the vertical coordinates of the pixels are greater than or equal to 0; and
    the horizontal coordinates and vertical coordinates of the pixels are respectively less than the width and height of the pixel processing area.

6. The text processing method according to claim 5, wherein the method further comprises:
    determining, by a neon register, whether the preset conditions are satisfied.

7. The text processing method according to claim 6, wherein the neon register is any one of a 128 bit register and a 64 bit register.

8. An electronic device, comprising: at least one processor; and a memory in communication connection with the at least one processor; wherein the memory stores an instruction which is capable of being executed by the at least one processor, and the instruction is configured to perform the following operations comprising:
    according to a coordinate value of each pixel in a text image, determining a plurality of center pixels of the text image and adjacent pixels of each of the center pixels;
    acquiring a coordinate value of each of the center pixels, spatial offsets of the adjacent pixels of each of the center pixels, and a width of a pixel processing area;

acquiring position information of each of the adjacent pixels according to the coordinate value of each of the center pixels, the spatial offsets of the adjacent pixels of each of the center pixels, the width of the pixel processing area, and a preset vector calculation formula; and acquiring a text of the text image according to the position information and a preset mask mapping relationship.

9. A non-transitory computer-readable storage medium, storing a computer program, wherein the program is executed by a processor to implement the text processing method according to claim 1.

10. The electronic device according to claim 8, wherein the operation of acquiring position information of each of the adjacent pixels according to the coordinate value of each of the center pixels, the spatial offsets of the adjacent pixels of each of the center pixels, the width of the pixel processing area, and a preset vector calculation formula comprises:

acquiring a horizontal coordinate and a vertical coordinate of each of the center pixels;

acquiring a first vector product according to the width of the pixel processing area and the spatial offsets of the adjacent pixels;

acquiring a second vector product according to the horizontal coordinate of each of the center pixels and the spatial offsets of the adjacent pixels;

acquiring a third vector product according to the first vector product and the vertical coordinate of each of the center pixels; and acquiring the position information of each of the adjacent pixels according to the second vector product and the third vector product.

11. The electronic device according to claim 8, wherein the adjacent pixels of each of the center pixels comprises eight pixels adjacent to the center pixel, the eight pixels comprises two pixels located in a row where the center pixel is located, three pixels located in a row previous to the row where the center pixel is located, and three pixels located in a row next to the row where the center pixel is located; and the spatial offsets of the eight pixels are respectively 1, 2, 3, 4, 5, 6, 7, and 8 according to an order from left to right in each row and an order from top to bottom in adjacent rows of pixels.

12. The electronic device according to claim 8, wherein the operation of according to a coordinate value of each pixel in a text image, determining a plurality of center pixels of the text image and adjacent pixels of each of the center pixels comprises:

acquiring a coordinate value of each pixel in the text image and the width and height of the pixel processing area;

determining whether the coordinate value of each pixel in the text image satisfies preset conditions; and taking pixels satisfying the preset conditions as the center pixels.

13. The electronic device according to claim 12, wherein the preset conditions are that:

the horizontal coordinates of the pixels are greater than or equal to 0;

the vertical coordinates of the pixels are greater than or equal to 0; and the horizontal coordinates and vertical coordinates of the pixels are respectively less than the width and height of the pixel processing area.

14. The electronic device according to claim 13, wherein the operations further comprise:

determining, by a neon register, whether the preset conditions are satisfied.

15. The electronic device according to claim 14, wherein the neon register is any one of a 128 bit register and a 64 bit register.

* * * * *